(12) United States Patent
Yamashina et al.

(10) Patent No.: US 8,414,979 B2
(45) Date of Patent: Apr. 9, 2013

(54) RADIATION-CURABLE RESIN COMPOSITION, RADIATION-CURABLE COATING MATERIAL, AND METHOD FOR FORMING PROTECTIVE LAYER

(75) Inventors: Yohzoh Yamashina, Ichihara (JP); Hiroyuki Tokuda, Sakura (JP); Youichi Tanimoto, Chiba (JP); David, Takaishi (JP); Nobuyuki Koike, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/530,070

(22) PCT Filed: Mar. 4, 2008

(86) PCT No.: PCT/JP2008/053829
§ 371 (c)(1),
(2), (4) Date: Sep. 4, 2009

(87) PCT Pub. No.: WO2008/108358
PCT Pub. Date: Sep. 12, 2008

(65) Prior Publication Data
US 2010/0104765 A1    Apr. 29, 2010

(30) Foreign Application Priority Data
Mar. 8, 2007   (JP) .................................. 2007-058522

(51) Int. Cl.
*B05D 3/06* (2006.01)
(52) U.S. Cl. ......... 427/487; 427/496; 427/508; 526/319
(58) Field of Classification Search .................... None
See application file for complete search history.

(56) References Cited

U.S. PATENT DOCUMENTS
2006/0167200 A1*   7/2006   Fujimoto et al. ............ 526/329.7

FOREIGN PATENT DOCUMENTS
| EP | 1231190 A1 | 8/2002 |
| JP | 2002-241646 A | 8/2002 |
| JP | 2006-328364 A | 12/2006 |
| JP | 2007-131837 A | 5/2007 |

OTHER PUBLICATIONS

Abstracts and partial machine translation of JP2002-241646, Aug. 2002.*
Supplemental European Search Report dated May 23, 2012, issued for the corresponding European patent application No. 08721249.4.

* cited by examiner

*Primary Examiner* — Erma Cameron
(74) *Attorney, Agent, or Firm* — Edwards Wildman Palmer LLP; James E. Armstrong, IV

(57) ABSTRACT

An object of the present invention is to provide a radiation-curable coating material which forms a cured coating film having high hardness and low curing shrinkage, a radiation-curable resin composition for obtaining the radiation-curable coating material, and a method for forming a protective layer using the radiation-curable coating material. The present invention provides a radiation-curable resin composition including an urethane (meth)acrylate (A), which is obtained by reacting a bicyclo ring-containing polyisocyanate compound (a1), a hydroxyl group-containing, trifunctional or higher polyfunctional (meth)acrylate (a2) and a tris(2-hydroxyalkyl)isocyanurate di(meth)acrylate (a3); a radiation-curable coating material including the above resin composition; and a method for forming a protective layer, which includes: applying the above radiation-curable coating material onto a support to form a layer of the radiation-curable coating material thereon; and irradiating the layer of the coating material with radiation thereby curing the layer of the coating material to form a protective layer.

8 Claims, No Drawings

RADIATION-CURABLE RESIN COMPOSITION, RADIATION-CURABLE COATING MATERIAL, AND METHOD FOR FORMING PROTECTIVE LAYER

CROSS REFERENCE TO RELATED APPLICATIONS

This is the U.S. National Phase application under 35 U.S.C. §371 of International Patent Application No. PCT/JP2008/053829, filed Mar. 4, 2008, which claims the benefit of Japanese Patent Application Nos. JP2007-058522, filed Mar. 8, 2007, all of which are incorporated by reference herein. The International Application was published in Japanese on Sep. 12, 2008 as WO 2008/108358 under PCT Article 21(2).

TECHNICAL FIELD

The present invention relates to a radiation-curable resin composition which gives a cured coating film having high surface hardness and low curing shrinkage, a radiation-curable coating material containing the radiation-curable resin composition, and a method for forming a protective layer in which a protective layer is formed on a surface of a molded article using the radiation-curable coating material.

BACKGROUND OF THE INVENTION

Since plastic materials and woodworking materials including engineering plastics are light in weight and have moldability and tenacity, they have recently been used as base materials for machines, general industrial products and daily miscellaneous goods, mainly for electric appliances. However, base materials such as plastic materials and wood materials have low hardness and poor abrasion resistance and are therefore frequently provided with a surface protective layer by applying and curing a coating material on a surface of the base material.

In order to provide the surface protective layer, for example, a coating agent containing a radiation-curable resin composition which is cured by irradiation of ultraviolet rays or electron beams (radiation-curable coating material) has been put into practical use in view of such advantages as energy saving, improvement in workability and improvement in productivity upon formation of the surface protective layer. However, in the radiation-curable coating material which forms a protective layer having high hardness, deformation of a base material and cracking of a cured coating film are likely to occur due to shrinkage upon curing (curing shrinkage), and thus a radiation-curable coating material, which gives a cured coating film having high hardness and low curing shrinkage, is required.

As the radiation-curable coating material which gives a cured coating film having high hardness and low curing shrinkage, for example, a resin composition for radiation-curable coating material is disclosed, which is obtained by reacting a (meth)acrylate compound having a hydroxyl group and two or more (meth)acryloyl groups with an aliphatic polyisocyanate compound in a molar ratio (OH/NCO) of a hydroxyl group to an isocyanate group within a range from 1.01 to 1.24, and also contains a urethane (meth)acrylate compound having 5 or more (meth)acryloyl groups on average (for example, refer to Japanese Unexamined Patent Publication, First Publication No. 2002-241646 ("JP '646")). Although a cured coating film having high hardness is obtained from a radiation-curable coating material using the resin composition for radiation-curable coating material disclosed in Patent Document 1, there is a problem that, when the cured coating film is formed on a thin base material such as a film, the coating film exhibits large curing shrinkage and deformation such as curl of the base material occurs.

SUMMARY OF THE INVENTION

An object of the present invention is to provide a radiation-curable coating material which forms a cured coating film having high hardness and low curing shrinkage, a radiation-curable resin composition for obtaining the radiation-curable coating material, and a method for forming a protective layer using the radiation-curable coating material.

The present inventors have intensively studied and thus the following findings were obtained.

(1) In JP '646, a radiation-curable resin composition containing urethane (meth)acrylate, which is obtained by using a polyisocyanate compound containing a bicyclo ring as the aliphatic polyisocyanate compound, and using a trifunctional or higher polyfunctional (meth)acrylate having a hydroxyl group and tris(2-hydroxyalkyl)isocyanurate di(meth)acrylate in combination as the (meth)acrylate compound having a hydroxyl group and two or more (meth)acryloyl groups, gives a radiation-curable coating material which can form a cured coating film having high hardness and low curing shrinkage.

(2) The radiation-curable resin composition gives a radiation-curable coating material capable of forming a cured coating film having high hardness and low curing shrinkage without using urethane (meth)acrylate reacted in a molar ratio (OH/NCO) of a hydroxyl group to an isocyanate group within a range from 1.01 to 1.24, unlike the resin composition for radiation-curable coating material disclosed in Patent Document 1. Therefore, the radiation-curable resin composition has a broader room for designing in terms of urethane (meth)acrylate.

(3) A cured coating film having high hardness and low curing shrinkage is easily obtained by applying the radiation-curable coating material onto a support such as a molded article to form a layer of the radiation-curable coating material, and irradiating the layer of the coating material with radiation thereby curing the layer of the coating material.

The present invention has been completed based on the findings described above.

The present invention provides a radiation-curable resin composition including an urethane (meth)acrylate (A), which is obtained by reacting a bicyclo ring-containing polyisocyanate compound (a1), a hydroxyl group-containing, trifunctional or higher polyfunctional (meth)acrylate (a2) and a tris (2-hydroxyalkyl)isocyanurate di(meth)acrylate (a3).

Also, the present invention provides a radiation-curable coating material including the above resin composition for radiation-curable coating material.

Furthermore, the present invention provides a method for forming a protective layer, which includes: applying the above radiation-curable coating material onto a support to form a layer of the radiation-curable coating material thereon; and irradiating the layer of the coating material with radiation thereby curing the layer of the coating material to form a protective layer.

The present invention can provide a radiation-curable coating material which can form a cured coating film having high hardness and low curing shrinkage, and a radiation-curable resin composition which gives the radiation-curable coating material. Also, the present invention can provide a method for forming a protective layer, which can easily form a cured coating film having high hardness and low curing shrinkage.

DETAILED DESCRIPTION OF THE INVENTION

The urethane (meth)acrylate (A) used in the present invention is obtained by reacting a bicyclo ring-containing polyisocyanate compound (a1), a hydroxyl group-containing, trifunctional or higher polyfunctional (meth)acrylate (a2) and a tris(2-hydroxyalkyl)isocyanurate di(meth)acrylate (a3).

Examples of the polyisocyanate compound include 2,5- or 2,6-diisocyanate methylnorbornane (norbornane diisocyanate), 2,5- or 2,6-diisocyanate methyl-2-isocyanate propylnorbornane and bicycloheptane triisocyanate. Among these polyisocyanate compounds, norbornane diisocyanate is preferred.

It is preferred to use only a bicyclo ring-containing polyisocyanate compound (a1) as the polyisocyanate compound upon preparation of the urethane (meth)acrylate (A) used in the present invention since a cured coating film having high surface hardness and low curing shrinkage is obtained. As long as the effects of the present invention are not adversely affected, a polyisocyanate compound other than the polyisocyanate (a1) can be used. The amount of the polyisocyanate compound other than the polyisocyanate (a1) used is preferably from 0.1 to 10 parts by weight based on 100 parts by weight of the polyisocyanate (a1).

Examples of the polyisocyanate compound other than the polyisocyanate (a1) include an aliphatic polyisocyanate other than the polyisocyanate (a1), and an aromatic polyisocyanate.

Examples of the aliphatic polyisocyanate other than polyisocyanate (a1) include a linear aliphatic polyisocyanate and a cyclic aliphatic polyisocyanate.

Examples of the linear aliphatic polyisocyanate include diisocyanate such as 1,6-hexamethylene diisocyanate, 1,4-tetramethylene diisocyanate, 1,12-dodecamethylene diisocyanate, 2,4,4-trimethylhexamethylene diisocyanate or lysine diisocyanate; and triisocyanate such as 1,3,6-hexamethylene triisocyanate, 1,8-diisocyanate-4-isocyanatemethyloctane or 2-isocyanateethyl(2,6-diisocyanate)hexanoate.

Examples of the cyclic aliphatic polyisocyanate include 1,3- or 1,4-bis(isocyanatemethylcyclohexane), 1,3- or 1,4-diisocyanatecyclohexane, 3,5,5-trimethyl(3-isocyanatemethyl)cyclohexylisocyanate and dicyclohexylmethane-4,4'-diisocyanate.

Examples of the aromatic polyisocyanate include diisocyanate such as tolylene diisocyanate, diphenylmethane diisocyanate, 1,3-xylene diisocyanate, 1,4-xylene diisocyanate, 1,3-tetramethylxylene diisocyanate, 1,4-tetramethylxylene diisocyanate, 1,5-naphthalene diisocyanate, tolidine diisocyanate, 1,4-phenylene diisocyanate or 1,6-phenylene diisocyanate; and triisocyanate such as triphenylmethane triisocyanate or tris(isocyanatephenyl)thiophosphate.

Furthermore, an adduct type polyisocyanate compound synthesized from the aliphatic diisocyanate compound and/or the aromatic diisocyanate and polyfunctional polyol compound, and an isocyanurate type polyisocyanate composed of a trimer of the aliphatic diisocyanate compound and/or the aromatic diisocyanate compound can be exemplified as the polyisocyanate compound other than the norbornane diisocyanate (a1).

Examples of the hydroxyl group-containing, trifunctional or higher polyfunctional (meth)acrylate (a2) used in the present invention include pentaerythritol tri(meth)acrylate, dipentaerythritol tri(meth)acrylate, dipentaerythritol tetra(meth)acrylate and dipentaerythritol penta(meth)acrylate. Among these trifunctional or higher polyfunctional (meth) acrylates, pentaerythritol tri(meth)acrylate is preferred since a radiation-curable coating material capable of forming a cured coating film having high hardness and low curing shrinkage is obtained.

Examples of the tris(2-hydroxyalkyl)isocyanurate di(meth)acrylate (a3) used in the present invention include tris(2-hydroxyethyl)isocyanurate di(meth)acrylate, tris(2-hydroxypropyl)isocyanurate di(meth)acrylate and tris(2-hydroxybutyl)isocyanurate di(meth)acrylate. Among these, tris (2-hydroxyethyl)isocyanurate di(meth)acrylate is preferred.

The radiation-curable resin composition of the present invention contains an urethane (meth)acrylate (A) obtained by reacting a bicyclo ring-containing polyisocyanate compound (a1), a hydroxyl group-containing, trifunctional or higher polyfunctional (meth)acrylate (a2) and a tris(2-hydroxyalkyl)isocyanurate di(meth)acrylate (a3). By allowing the urethane (meth)acrylate to be contained, the obtained cured coating film exhibits low shrinkage, while having high hardness. The present inventors consider that such an excellent effect is attained as a result of utilizing characteristics of a rigid bicyclo ring structure in the molecule of the bicyclo ring-containing polyisocyanate compound (a1) so as to have it exhibit high hardness, and also the synergistic effect coming from the characteristics based on the rigid ring structure of the tris(2-hydroxyalkyl)isocyanurate di(meth)acrylate (a3) having an isocyanurate ring structure in the molecule and the characteristics that relaxes strain of the structure by adjacent alkyl groups in the molecule, and that this relaxation effect reaches to the polyisocyanate compound (a1) having a rigid bicyclo ring too. The present inventors also consider that the rigidity and relaxation effect give a cured coating film having low shrinkage under a low dosage of irradiation, while maintaining hardness.

In the preparation of urethane (meth)acrylate (A) used in the present invention, a hydroxyl group-containing, trifunctional or higher polyfunctional (meth)acrylate (a2) and tris (2-hydroxyalkyl)isocyanurate di(meth)acrylate (a3) are used in combination as a (meth)acrylate compound having a hydroxyl group and two or more (meth)acryloyl groups. The urethane (meth)acrylate (A) used in the present invention is preferably urethane (meth)acrylate obtained by using the hydroxyl group-containing, trifunctional or higher polyfunctional (meth)acrylate (a2) and the tris(2-hydroxyalkyl)isocyanurate di(meth)acrylate (a3) in a weight ratio [(a2)/(a3)] within a range from 99.9/0.1 to 30/70 since a radiation-curable resin composition and a radiation-curable coating material, which give a cured coating film having high hardness and low curing shrinkage, are obtained, and more preferably urethane (meth)acrylate obtained by using them in a weight ratio [(a2)/(a3)] within a range from 99.5/0.5 to 35/65.

In the preparation of the urethane (meth)acrylate (A), a weight ratio [(a2)/(a3)] of the hydroxyl group-containing, trifunctional or higher polyfunctional (meth)acrylate (a2) to the tris(2-hydroxyalkyl)isocyanurate di(meth)acrylate (a3) is preferably within a range from 30/70 to 70/30 since a radiation-curable resin composition and a radiation-curable coating material, which have high hardness, low curing shrinkage and excellent tight adhesion with a base material, are obtained, and more preferably from 35/65 to 65/35.

In the preparation of the urethane (meth)acrylate (A), a weight ratio [(a2)/(a3)] of the hydroxyl group-containing, trifunctional or higher polyfunctional (meth)acrylate (a2) to the tris(2-hydroxyalkyl)isocyanurate di(meth)acrylate (a3) is preferably within a range from 99.9/0.1 to 83/17 since a radiation-curable resin composition and a radiation-curable coating material, which have high hardness, low curing shrinkage and excellent storage stability, are obtained, and more preferably from 99.5/0.5 to 85/15.

In the preparation of the urethane (meth)acrylate (A) used in the present invention, a (meth)acrylate compound having a hydroxyl group and a (meth)acryloyl group other than the hydroxyl group-containing, trifunctional or higher polyfunctional (meth)acrylate (a2) and the tris(2-hydroxyalkyl)isocyanurate di(meth)acrylate (a3) may be used as long as the effects of the present invention are not adversely affected.

Examples of the (meth)acrylate compound having a hydroxyl group and a (meth)acryloyl group other than the hydroxyl group-containing, trifunctional or higher polyfunctional (meth)acrylate (a2) and the tris(2-hydroxyalkyl)isocyanurate di(meth)acrylate (a3) include di(meth)acrylate of a trihydric alcohol, such as trimethylolpropane di(meth)acrylate, ethoxylated trimethylolpropane di(meth)acrylate, propoxylated trimethylolpropane di(meth)acrylate and glycerin di(meth)acrylate, or di(meth)acrylate in which hydroxyl groups of the di(meth)acrylate are modified with ε-caprolactone; and polyfunctional (meth)acrylate of a tetrafunctional or higher polyhydric alcohol having a hydroxyl group, such as pentaerythritol di(meth)acrylate, dipentaerythritol di(meth)acrylate, ditrimethylolpropane di(meth)acrylate, dipentaerythritol tri(meth)acrylate, ditrimethylolpropane tri (meth)acrylate, dipentaerythritol tetra(meth)acrylate, ditrimethylolpropane tetra(meth)acrylate, dipentaerythritol hexa (meth)acrylate and ditrimethylolpropane hexa(meth) acrylate, or polyfunctional (meth)acrylate having hydroxyl groups in which a portion of the hydroxyl groups of the polyfunctional (meth)acrylate having hydroxyl groups are modified with an alkyl group or ε-caprolactone.

When the (meth)acrylate compound having a hydroxyl group and a (meth)acryloyl group other than the hydroxyl group-containing, trifunctional or higher polyfunctional (meth)acrylate (a2) and the tris(2-hydroxyalkyl)isocyanurate di(meth)acrylate (a3) is used, the amount is preferably from 0.1 to 10 parts by weight based on 100 parts by weight of the total of the hydroxyl group-containing, trifunctional or higher polyfunctional (meth)acrylate (a2) and the tris(2-hydroxyalkyl)isocyanurate di(meth)acrylate (a3).

The urethane (meth)acrylate (A) used in the present invention is obtained, for example, by reacting a bicyclo ring-containing polyisocyanate compound containing (a1), a hydroxyl group-containing, trifunctional or higher polyfunctional (meth)acrylate (a2) and a tris(2-hydroxyalkyl)isocyanurate di(meth)acrylate (a3) under a conventional reaction condition in urethanation reaction, specifically reacting them at 20 to 100° C., and preferably 40 to 80° C. The reaction can be performed in a nitrogen atmosphere, but is preferably performed in a dry air atmosphere containing oxygen so as not to cause polymerization of (meth)acryloyl groups. The reaction time is usually from 1 to 20 hours.

In the urethanation reaction, a conventional organic tin catalyst such as dibutyltin diacetate or dibutyltin dilaurate, or a tertiary amine compound such as triethylamine may be used so as to accelerate the reaction. In order to suppress polymerization of the (meth)acryloyl group during the reaction, a polymerization inhibitor such as methoquinone or hydroquinone, and an antioxidant may be used.

The urethane (meth)acrylate (A) used in the present invention is preferably urethane (meth)acrylate obtained by reacting a bicyclo ring-containing polyisocyanate compound (a1), a hydroxyl group-containing, trifunctional or higher polyfunctional (meth)acrylate (a2) and a tris(2-hydroxyalkyl)isocyanurate di(meth)acrylate (a3) in a molar ratio (OH/NCO) of hydroxyl group/isocyanate group within a range from 1.0 to 1.25, since it requires shorter time until the isocyanate group disappears in the urethanation reaction, and gives a radiation-curable resin composition and a radiation-curable coating material, which gives a cured coating film having low curing shrinkage due to lessened amount of residual, hydroxyl group-containing, trifunctional or higher polyfunctional (meth)acrylate (a2) and tris(2-hydroxyalkyl)isocyanurate di(meth)acrylate (a3). It is more preferred to use urethane (meth)acrylate obtained by reacting them in a molar ratio (OH/NCO) of hydroxyl group/isocyanate group within a range from 1.0 to 1.10.

In the urethanation reaction, organic solvents, which have no active hydrogen group capable of reacting with an isocyanate group, can be used alone or a mixture of two or more kinds can be used so as to adjust viscosity. Specific examples thereof include an ester solvent such as ethyl acetate or butyl acetate; a ketone solvent such as acetone, methyl ethyl ketone or methyl isobutyl ketone; and an aromatic solvent such as toluene or xylene.

The radiation-curable resin composition and the radiation-curable coating material of the present invention basically contain a urethane (meth)acrylate (A), but may optionally contain a radical polymerizable monomer (B) other than the urethane (meth)acrylate compound (A) as long as the effects of the present invention are not adversely affected.

The radiation-curable resin composition and the radiation-curable coating material of the present invention basically contain the urethane (meth)acrylate (A), but may optionally contain an organic solvent (C) as long as the effects of the present invention are not adversely affected.

Examples of the radical polymerizable monomer (B) include di(meth)acrylate such as butanediol di(meth)acrylate, hexanediol di(meth)acrylate, ethoxylated hexanediol di(meth)acrylate, propoxylated hexanediol di(meth)acrylate, diethylene glycol di(meth)acrylate, polyethylene glycol di(meth)acrylate, polypropylene glycol di(meth)acrylate, neopentyl glycol di(meth)acrylate, ethoxylated neopentyl glycol di(meth)acrylate or hydroxypivalic acid neopentyl glycol di(meth)acrylate; mono(meth)acrylate such as 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloyl morpholine, N-vinyl pyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth) acrylate, cetyl (meth)acrylate, stearyl (meth)acrylate, benzyl (meth)acrylate, 2-ethoxyethyl (meth)acrylate, 3-methoxybutyl (meth)acrylate, ethylcarbitol (meth)acrylate, phosphoric acid (meth)acrylate, ethylene oxide-modified phosphoric acid (meth)acrylate, phenoxy(meth)acrylate, ethylene oxide-modified phenoxy(meth)acrylate, propylene oxide-modified phenoxy(meth)acrylate, nonylphenol (meth)acrylate, ethylene oxide-modified nonylphenol (meth)acrylate, propylene oxide-modified nonylphenol (meth)acrylate, methoxydiethylene glycol (meth)acrylate, methoxypolyethylene glycol (meth)acrylate, methoxypropylene glycol (meth)acrylate, 2-(meth)acryloyloxyethyl-2-hydroxypropylphthalate, 2-hydroxy-3-phenoxypropyl (meth)acrylate, 2-(meth)acryloyloxyethylhydrogen phthalate, 2-(meth)acryloyloxypropylhydrogen phthalate, 2-(meth) acryloyloxypropylhexahydrohydrogen phthalate, 2-(meth) acryloyloxypropyltetrahydrohydrogen phthalate, dimethylaminoethyl (meth)acrylate, trifluoroethyl (meth) acrylate, tetrafluoropropyl (meth)acrylate, hexafluoropropyl (meth)acrylate, octafluoropropyl (meth)acrylate, octafluoropropyl (meth)acrylate or adamanthyl mono(meth)acrylate; tri(meth)acrylate such as trimethylolpropane tri(meth)acrylate, ethoxylated trimethylolpropane tri(meth)acrylate, propoxylated trimethylolpropane tri(meth)acrylate, tris(2-hydroxyethyl)isocyanurate tri(meth)acrylate or glycerin tri(meth)acrylate; tetrafunctional or higher polyfunctional (meth)acrylate such as pentaerythritol tri(meth)acrylate, dipentaerythritol tri(meth)acrylate, ditrimethylolpropane tri(meth)acrylate, pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate or ditrimethylolpropane hexa(meth)acrylate; and polyfunctional (meth)acrylate in which a portion of the above (meth)acrylate is substituted with an alkyl group or ε-caprolactone.

These radical polymerizable monomers (B) may be used alone, or two or more kinds of them may be used in combination. The amount of the radical polymerizable monomer (B) is preferably 100 parts by weight or less, and particularly preferably from 10 to 70 parts by weight, based on 100 parts by weight of the urethane (meth)acrylate compound (A) so as to avoid deterioration of abrasion resistance of the obtained coating film.

The organic solvent (C) having a boiling point of 50 to 200° C. is preferred in view of giving a resin composition for radiation-curable coating material and a radiation-curable coating material, which are excellent in workability upon coating and drying properties before and after curing. Examples thereof include an alcohol solvent such as methanol, isopropyl alcohol, n-butanol or isobutanol; an ester solvent such as methyl acetate, ethyl acetate, butyl acetate, ethylene glycol monoethyl ether, ethylene glycol monoethyl ether acetate or ethylene glycol monobutyl ether acetate; a ketone solvent such as acetone, methyl ethyl ketone or methyl isobutyl ketone; an aromatic solvent such as toluene or xylene, or mixtures thereof.

When the organic solvent (C) is allowed to be contained in the radiation-curable resin composition and the radiation-curable coating material obtained by the present invention, the following procedure is preferred; the resin composition for radiation-curable coating material or the radiation-curable coating material is applied onto a support to form a layer of the radiation-curable resin composition or the radiation-curable coating material thereon, and the organic solvent (C) is removed before irradiating the layer of the coating material with radiation. As a means for removing the organic solvent (C), for example, a hot air dryer can be used. The amount of the organic solvent (C) is not particularly limited, but it is generally determined as the solid content of the coating material falls within a range from 10 to 70% by weight.

In the radiation-curable resin composition and the radiation-curable coating material of the present invention, it is possible to use various radiation-curable resins in addition to the urethane (meth)acrylate (A), such as unsaturated double bond-containing resins represented by urethane acrylate resin, epoxy acrylate resin, vinyl urethane resin, vinyl ester resin and unsaturated polyester resin depending on a targeted performance, as long as the effects of the present invention are not adversely affected.

To the radiation-curable resin composition and the radiation-curable coating material of the present invention, a photopolymerization initiator (D) can be added according to the purposes. As the photopolymerization initiator (D), various photopolymerization initiators can be used. Examples of the photoinitiator (D) include compounds capable of generating a radical by hydrogen abstraction, such as benzophenone, benzyl, Michler's ketone, thioxanthone and anthraquinone. These compounds are generally used in combination with a tertiary amine such as methylamine, diethanolamine, N-methyldiethanolamine or tributylamine.

Examples of the photopolymerization initiator (D) also include compounds capable of generating a radical by intramolecular cleavage. Specific examples thereof include benzoin, dialkoxyacetophenone, acyloxime ester, benzyl ketal, hydroxyalkylphenone and halogenoketone.

A photopolymerization initiator such as hydroquinone, benzoquinone, toluhydroquinone or para-tertiary butyl catechol can be optionally used in combination with the photopolymerization initiator (D).

The resin composition for radiation-curable coating material and the radiation-curable coating material of the present invention can also contain pigments, natural or synthetic polymeric materials and other compounding agents.

No particular limitation is imposed on the pigment, and examples thereof include organic pigments and inorganic pigments, such as extender pigments, white pigments, black pigments, gray pigments, red pigments, brown pigments, green pigments, blue pigments, violet pigments, metallic powder pigments, fluorescent pigments and pearlescent pigments, and plastic pigments, each described in "Coating Material Handbook, 1970 (ed. by Japan Paint Manufacturers Association). Various colorants can be given as examples of the colorant. The organic pigments include, for example, insoluble azo pigments such as Benzidine Yellow, Hansa Yellow and Lake Red 4R; soluble azo pigments such as Lake Red C, Carmine 6B and Bordeaux 10; (copper) phthalocyanine pigments such as Phthalocyanine Blue and Phthalocyanine Green; basic dye lakes such as Rhodamine Lake and Methyl Violet Lake; mordant dye type pigments such as Quinoline Lake and Fast Sky Blue; vat dye type pigments such as anthraquinone pigments, thioindigo pigments and perinone pigments; quinacridone pigments such as Cinquasia Red B; dioxazine pigments such as Dioxazine Violet; condensed azo pigments such as chromophthal pigments and aniline black.

Examples of the inorganic pigment include chromates such as Chrome Yellow, Zinc Chromate and Molybdate Orange; ferrocyanide compounds such as iron blue pigments; metal oxides such as Titanium Oxide, Zinc Oxide, Mapico Yellow, Iron Oxide, Red Oxide and Chrome Oxide Green; sulfides or selenides such as Cadmium Yellow, Cadmium Red and Mercury Sulfide; sulfates such as Barium Sulfate and Lead Sulfate; silicates such as Calcium Silicate and Ultramarine Blue; carbonates such as Calcium Carbonate and Magnesium Carbonate; phosphates such as Cobalt Violet and Manganese Violet; metallic powder pigments such as aluminum powder, gold powder, silver powder, copper powder, bronze powder and brass powder; flake pigments or mica flake pigments of these metals; metallic pigments or pearlescent pigments such as mica flake pigments covered with a metal oxide and micastate iron oxide pigments; and graphite and carbon black.

Examples of the extender pigment include precipitated barium sulfate, gohun, precipitated calcium carbonate, calcium bicarbonate, white (Japanese) marble, alumina white, silica, hydrous fine silica particles (white carbon), anhydrous ultrafine silica particles (aerosil), silica sand, talc, precipitated magnesium carbonate, bentonite, clay, kaolin and Chinese Yellow.

Furthermore, plastic pigments [for example, Grandol PP-1000, PP-20005, manufactured by Dainippon Ink and Chemicals, Incorporated.] can be used.

The amount of the pigment varies depending on the kind of pigment depending on the kind of the pigment, desired color hue and kind of the photopolymerization initiator and no particular limitation is imposed on it. In the case of curing by ultraviolet rays, since a color pigment absorbs much of the ultraviolet rays required for curing, the amount of the pigment preferably falls within a range where sufficient ultraviolet rays required for curing are supplied to radical polymerizable unsaturated double bonds. It is preferably 30 parts by weight or less based on 100 parts by weight of the resin solid content.

Examples of the natural or synthetic polymeric materials include other various vinyl ester resins, polyisocyanate compounds, polyepoxides, acrylic resins, alkyd resins, urea resins, melamine resins, polyvinyl acetate, vinyl acetate-based copolymers, polybutadiene elastomer, saturated polyesters, saturated polyethers, cellulose derivatives such as nitrocelluloses or cellulose acetate butyrate; and fats and oils such as linseed oil, tung oil, soybean oil, castor oil or epoxidated oils.

Examples of the other compounding agent include antioxidants, ultraviolet absorbers, leveling agents, surfactants, slipping agents and defoamers.

The radiation-curable coating material of the present invention includes the resin composition for radiation-curable coating material of the present invention. The radiation-curable coating material of the present invention is obtained, for example, by optionally adding the radical polymerizable monomer (B), the organic solvent (C) and the photopolymerization initiator (D) to the resin composition for radiation-curable coating material of the present invention.

The method for forming a protective layer of the present invention includes: applying the radiation-curable coating material of the present invention onto a support to form a layer of the radiation-curable coating material thereon; and irradiating the layer of the coating material with radiation thereby curing the layer of the coating material to form a protective layer.

Examples of the support include a plastic base material. Examples of the plastic base material include a plastic molded article and a plastic film. Examples of the plastic molded article include molded articles produced from an ABS resin, a polymethyl methacrylate resin, a polycarbonate resin, a polypropylene resin, an unsaturated polyester resin and a polymer alloy resin thereof by injection molding, extrusion molding or press molding. Examples of the plastic film include films produced from polyethylene, polypropylene, triacetyl cellulose, polyethylene terephthalate, vinyl chloride and polycarbonate.

The method for forming a protective layer of the present invention includes a step of applying a radiation-curable coating material of the present invention onto a support to form a layer of the radiation-curable coating material. In this step, the radiation-curable coating material may be directly applied onto the support. However, when design properties are imparted to the support, the radiation-curable coating material of the present invention may be applied as a top coat after applying a base coat agent onto the support. When a plastic film is used as the support, surface oxidation such as corona discharge or chromic acid treatment, or surface roughening such as sand blast or solvent treatment may be performed so as to modify a surface of the plastic film. Furthermore, the radiation-curable coating material of the present invention may be applied as a top coat after coating the surface with a solution or emulsion type coating agent so as to impart heat sealability, moistureproofness and improved adhesion of the coating material to the plastic film.

The base coat agent includes, for example, a coating material including an acrylic resin and a pigment and no particular limitation is imposed on the composition of the acrylic resin. Among these coating materials, a coating material using an acrylic resin obtained by copolymerizing a monomer mixture containing n-butyl (meth)acrylate and methyl (meth)acrylate as essential components is preferred since interlaminar adhesion between the base coat and the top coat composed of the radiation-curable coating material of the present invention is improved.

As the pigment contained in the base coat agent, for example, pigments used in the radiation-curable resin composition and the radiation-curable coating material of the present invention can be used. The monomer mixture used to obtain an acrylic resin preferably contains n-butyl (meth)acrylate and methyl (meth)acrylate as essential components, as described above. If necessary, copolymerizable monomers other than n-butyl (meth)acrylate and methyl (meth)acrylate can be used in combination.

Typical examples of the copolymerizable monomer other than n-butyl (meth)acrylate and methyl (meth)acrylate include, but are not limited to, (meth)acrylic acid, ethyl (meth)acrylate, isopropyl (meth)acrylate, 2-ethylhexyl (meth)acrylate, isobutyl (meth)acrylate, tertiary butyl (meth)acrylate, n-hexyl (meth)acrylate, lauryl (meth)acrylate, N,N-dimethylaminoethyl (meth)acrylate, stearyl (meth)acrylate, maleic acid, itaconic acid, 2-hydroxyethyl (meth)acrylate, 2-hydroxypropyl (meth)acrylate, styrene, (meth)acrylamide, N-methylol(meth)acrylamide, diacetone(meth)acrylamide, glycidyl (meth)acrylate, vinyltoluene, vinyl acetate, vinyl chloride and (meth)acrylonitrile, and any monomers used for a conventional acrylic resin can be used.

Examples of a coating means for forming a layer of the radiation-curable coating material include a coating method such as gravure coating method, roll coating method, spray coating method, lip coating method or comma coating method; and a printing method such as gravure printing method or screen printing method. Coating is preferably performed so that a thickness of the cured protective layer is from 0.1 to 400 μm, and more preferably from 1 to 50 μm.

In the method for forming a protective layer of the present invention, a pattern layer may be formed for the purpose of imparting design properties. The pattern layer can be formed, for example, by printing a pattern on a support before applying the curable resin composition. The usable material of the pattern layer may be a pigmented ink containing a resin such as polyvinyl resin, polyamide resin, polyester resin, polyacrylic resin, polyurethane resin, polyvinyl acetal resin, polyester urethane resin, cellulose ester resin or alkyd resin as a binder, and a pigment or dye of a proper color as a colorant. As a method of forming the pattern layer, for example, a conventional printing method such as offset printing method, gravure printing method or screen printing method may be used. When multicolored printing or half-toning is performed, an offset printing method or a gravure printing method is suited. In the case of a single color, a coating method such as gravure coating method, roll coating method, comma coating method or lip coating method can also be employed. The pattern layer may be formed entirely or partially according to a pattern to be expressed. The pattern layer may be composed of a metal-deposited layer, or a combination of a printed layer and a metal-deposited layer.

When a pattern layer is formed, even in the case of printing it on a support before applying the curable resin composition, if adhesion between the pattern layer and the support is insufficient, adhesion between the pattern layer and the support can be improved in the same manner as improving the adhesion between the support and the radiation-curable coating material.

When a radiation-curable coating material containing an organic solvent is used as the radiation-curable coating material, an organic solvent may be removed after applying it on the support. Removal of the organic solvent may be conducted after or before irradiation with radiation. The organic solvent may be removed by letting the coating material to stand until the organic solvent is vaporized, or drying it using a dryer. It is preferred that the organic solvent is removed at a temperature of 70 to 130° C. for about 10 seconds to 10 minutes.

After a layer of the radiation-curable coating material is formed by the above method, the layer of the coating material is irradiated with radiation. Examples of the radiation include electron beams, ultraviolet rays and gamma rays. The irradiation conditions are decided according to the composition of the radiation-curable coating material used to obtain a protective layer. In the case of irradiation with ultraviolet rays, an integrated light quantity is preferably from 10 to 5,000 mj/cm$^2$, and more preferably from 50 to 1,000 mj/cm$^2$. In the case of electron beam irradiation, an irradiance level is preferably from 1 to 5 Mrad.

EXAMPLES

Examples and Comparative Examples further illustrate the present invention in more detail. In the following Examples and Comparative Examples, parts and percentages are by weight unless otherwise specified. NCO % (isocyanate content) is a numerical value in which the content of an isocyanate group in a sample is expressed in terms of weight.

Synthesis Example 1

Preparation of Urethane (Meth)Acrylate (A)

In a 1 liter flask equipped with a stirrer, a gas introducing tube, a capacitor and a thermometer, 625.3 g (2.098 mol) of pentaerythritol triacrylate, 0.6 g (0.002 mol) of tris 2-hydroxyethylisocyanurate diacrylate, 0.1 g of dibutyltin laurate, 0.9 g of Sumilizer BHT [antioxidant, manufactured by Sumitomo Chemical Industries Co., Ltd.], 0.3 g of methoquinone [polymerization inhibitor, manufactured by Seiko Chemical Co,. Ltd.] and 208.0 g of butyl acetate were added, and the temperature was gradually raised while mixing uniformly. When the temperature reached 60° C., 206.0 g (1.0 mol) of norbornane diisocyanate was added and the temperature was raised to 80° C. over 2 hour. The reaction was performed at 80° C. for 5 hours to obtain the urethane acrylate (A1).

Synthesis Examples 2 To 8 (Same As Above)

In the same manner as in Synthesis Example 1, except that the respective material components were used in each composition ratio shown in Table 1 and Table 2, the reaction was performed to obtain the urethane acrylates (A2) to (A8).

TABLE 1

|  | Synthesis Examples | | | |
| --- | --- | --- | --- | --- |
|  | 1 | 2 | 3 | 4 |
| Urethane acrylate | (A1) | (A2) | (A3) | (A4) |
| NBDi (g) | 206 | 206 | 206 | 206 |
| Sumilizer BHT (g) | 0.9 | 0.6 | 0.6 | 0.6 |
| Methoquinone (g) | 0.3 | 0.1 | 0.1 | 0.1 |
| Dibutyltin dilaurate (g) | 0.1 | 0.1 | 0.1 | 0.1 |
| Butyl acetate (g) | 208.0 | 208.1 | 208.6 | 212.6 |
| THEIC-DA (g) | 0.6 | 3.1 | 12.6 | 96.7 |
| PETA (g) | 625.3 | 623.3 | 615.7 | 547.7 |
| Appearance | Clear | Clear | Clear | Clear |
| PETA/THEIC-DA (weight ratio) | 99.9/0.1 | 99.5/0.5 | 98/2 | 85/15 |
| OH/NCO (mol ratio) | 1.05 | 1.05 | 1.05 | 1.05 |

TABLE 2

|  | Synthesis Examples | | | |
| --- | --- | --- | --- | --- |
|  | 5 | 6 | 7 | 8 |
| Urethane acrylate | (A5) | (A6) | (A7) | (A8) |
| NBDi (g) | 206 | 206 | 206 | 206 |
| Sumilizer BHT (g) | 0.6 | 0.6 | 0.6 | 0.6 |
| Methoquinone (g) | 0.1 | 0.1 | 0.1 | 0.1 |
| Dibutyltin dilaurate (g) | 0.1 | 0.1 | 0.1 | 0.1 |
| Butyl acetate (g) | 217.5 | 224.6 | 230.3 | 232.3 |
| THEIC-DA (g) | 199.2 | 346.2 | 464.9 | 506.2 |
| PETA (g) | 464.9 | 346.2 | 250.3 | 217.0 |
| Appearance | Clear | Clear | Clear | Clear |
| PETA/THEIC-DA (weight ratio) | 70/30 | 50/50 | 35/65 | 30/70 |
| OH/NCO (mol ratio) | 1.05 | 1.05 | 1.05 | 1.05 |

Synthesis Examples 9 To 11

Preparation of Comparative Urethane Acrylates

In the same manner as in Synthesis Example 1, except that the respective material components were used in each composition ratio shown in Table 3, the reaction was performed to obtain the comparative urethane acrylates (a1) to (a3).

TABLE 3

|  | Synthesis Examples | | |
| --- | --- | --- |
|  | 9 | 10 | 11 |
| Urethane acrylate | (a1) | (a2) | (a3) |
| NBDi (g) | 206 | 206 |  |
| Sumilizer BHT (g) |  |  | 222 |
| Methoquinone (g) | 0.9 | 0.6 | 0.6 |
| Dibutyltin dilaurate (g) | 0.3 | 0.1 | 0.1 |
| Butyl acetate (g) | 0.1 | 0.1 | 0.1 |
| THEIC-DA (g) | 208.0 | 245.2 | 225.0 |
| PETA (g) | 0.0 | 774.9 | 271.2 |
| Appearance | 625.5 | 0.0 | 406.8 |
| PETA/THEIC-DA (weight ratio) | Clear | Clear | Clear |
| OH/NCO (mol ratio) | 100/0 | 0/100 | 60/40 |
| Urethane acrylate | 1.05 | 1.05 | 1.05 |

<Footnote of Table 1, Table 2 and Table 3>
NBDi: norbornene diisocyanate
IPDi: isophorone diisocyanate
THEIC-DA: tris(2-hydroxyethyl)isocyanurate diacrylate.
PETA: pentaerythritol triacrylate
PETA/THEIC-DA (weight ratio): ratio (weight ratio) of pentaerythritol triacrylate to tris(2-hydroxyethyl)isocyanurate diacrylate
OH/NCO (molar ratio): ratio (molar ratio) of sum total of hydroxyl groups contained in pentaerythritol triacrylate and tris(2-hydroxyethyl)isocyanurate diacrylate/isocyanate contained in norbornane diisocyanate Example 1

As shown in Table 4, the urethane acrylate (A1) obtained in Synthesis Example was diluted with butyl acetate added so as to adjust the concentration of a nonvolatile component to 50%, and then blended with Irgacure #184 [photopolymerization initiator, 1-hydroxy-cyclohexyl-phenyl-ketone, manufactured by Ciba Specialty Chemicals Inc.] to prepare the radiation-curable coating material (X1). The obtained radiation-curable coating material (X1) can be denoted as a radiation-curable resin composition.

The radiation-curable coating material (X1) was applied onto a support to form a layer of the radiation-curable coating material, and then the layer of the coating material was irradiated with active energy radiation, thereby curing the layer of the coating material to form a protective layer. As the support, a 2 mm thick polymethyl methacrylate molded plate

[Sumipec E, manufactured by Sumitomo Chemical Industries Co., Ltd.] and a 100 μm thick PET film [COSMOSHINE A-4300 (manufactured by TOYOBO CO., LTD.)] were used. With respect to the protective layer obtained by using the polymethyl methacrylate molded plate as the support, hardness of the protective layer and cracking as one of curing shrinkage were evaluated. With respect to the protective layer obtained by using the PET film as the support, warp as one of curing shrinkage was evaluated. A method for forming a protective layer and a method for evaluation in each support are shown below. The evaluation results are shown in Table 4.

Method for Formation of a Protective Layer when Polymethyl Methacrylate Molded Plate is Used as a Support, and Method for Evaluation (1-1) Method For Formation of Protective Layer The radiation-curable coating material (X1) was applied onto Sumipec E using a bar coater in a dry film thickness of 20 μm to form a layer of the radiation-curable coating material on Sumipec E. The layer was dried at 70° C. for 5 minutes using a hot air dryer to remove the organic solvent through vaporization. Then using an ultraviolet irradiator, the layer of the coating material was passed through under a 80 W/cm high-pressure mercury lamp twice at a velocity of 5 m/min for irradiation with radiation thereby curing the coating material layer to form a protective layer.

(1-2) Method for Evaluation of Hardness of a Protective Layer

Hardness of a protective layer was evaluated by a pencil hardness method. Specifically, a scratch test was performed five times under a load of 1 kg using Mitsubishi Pencil Uni and the number without a scratch was counted. The smaller the number is, the higher the hardness is.

(1-3) Method for Evaluation of Cracking of a Protective Layer

A support with a protective layer formed was heated at 80° C. for 1 hour using a warm air dryer and allowed to stand at room temperature for 30 minutes, and then appearance of the coating film of the protective layer was visually observed. Samples with no cracking were rated "Good", whereas, samples with cracking were rated "Poor".

Method for Formation of Protective Layer when a PET Film is Used as a Support, and Method for Evaluation Support (2-1) Method for Formation of a Protective Layer A radiation-curable coating material (X1) was applied onto COSMOSHINE A-4300 (preliminarily cut into A4 size) using a bar coater in a dry film thickness of 10 μm to form a layer of the radiation-curable coating material on COSMOSHINE A-4300. The layer was dried at 70° C. for 5 minutes using a hot air dryer to remove the organic solvent through vaporization. Then using an ultraviolet irradiator, the layer of the coating material was passed through under a 80 W/cm high-pressure mercury lamp twice at a velocity of 5 m/min for irradiation of active energy radiation thereby curing the coating material layer to form a protective layer.

(2-2) Method for Evaluation of Warp of a Protective Layer

A sample measuring 5 cm by 5 cm was obtained by cutting out the center of COSMOSHINE A-4300 with a protective layer formed thereon. The sample was placed on an upper surface of a desk with a warped surface upward, to make one or more corners out of four suspended. In this state, a height of the corner of the support from the upper surface was measured by a ruler without touching the sample. This operation was performed on four corners, respectively, and an average height was calculated. It was adopted as an evaluation result of warp of the protective layer. The less the value is, the less the warp of the protective layer is.

Examples 2 to 8 and Comparative Examples 1 to 3

As shown in Table 4 to Table 6, each of the urethane acrylates [(A1) to (A8) and (a1) to (a3)) obtained in Synthesis Examples was diluted with butyl acetate added so as to adjust the concentration of a nonvolatile component to 50%, and then blended with Irgacure #184 [photopolymerization initiator, 1-hydroxy-cyclohexyl-phenyl-ketone, manufactured by Ciba Specialty Chemicals Inc.] to prepare radiation-curable coating materials (X2 to X8) and comparative radiation-curable coating materials (X1' to X3'). The obtained radiation-curable coating materials (X7 to X8) can be denoted as radiation-curable resin compositions.

In the same manner as in Example 1, the radiation-curable coating materials (X2 to X8) and comparative radiation-curable coating materials (X1' to X3') were evaluated. The evaluation results are shown in Table 4 to Table 6. In Table 6, there is a rating symbolized by "X" in the evaluation of warp of the protective layer, which means the average height exceeded 20 mm.

TABLE 4

|  |  | Examples | | | |
|---|---|---|---|---|---|
|  |  | 1 | 2 | 3 | 4 |
| Radiation-curable coating material |  | X1 | X2 | X3 | X4 |
| Urethane acrylate (parts) | A1 | 100 |  |  |  |
|  | A2 |  | 100 |  |  |
|  | A3 |  |  | 100 |  |
|  | A4 |  |  |  | 100 |
| Butyl acetate (parts) |  | 60 | 60 | 60 | 60 |
| Irgacure #184 (parts) |  | 3.2 | 3.2 | 3.2 | 3.2 |
| Nonvolatile component (%) |  | 50 | 50 | 50 | 50 |
| Evaluation results |  |  |  |  |  |
| Pencil hardness | 6H | 2 | 2 | 2 | 1 |
|  | 5H | 5 | 5 | 5 | 5 |
|  | 4H | 5 | 5 | 5 | 5 |
|  | 3H | 5 | 5 | 5 | 5 |
|  | 2H | 5 | 5 | 5 | 5 |
| Crack |  | Good | Good | Good | Good |
| Warp (mm) |  | 14 | 9 | 7 | 7 |

TABLE 5

|  |  | Examples | | | |
|---|---|---|---|---|---|
|  |  | 5 | 6 | 7 | 8 |
| Radiation-curable coating material |  | X5 | X6 | X7 | X8 |
| Urethane acrylate (parts) | A5 | 100 |  |  |  |
|  | A6 |  | 100 |  |  |
|  | A7 |  |  | 100 |  |
|  | A8 |  |  |  | 100 |
| Butyl acetate (parts) |  | 60 | 60 | 60 | 60 |
| Irgacure #184 (parts) |  | 3.2 | 3.2 | 3.2 | 3.2 |
| Nonvolatile component (%) |  | 50 | 50 | 50 | 50 |
| Evaluation results |  |  |  |  |  |
| Pencil hardness | 6H | 0 | 0 | 0 | 0 |
|  | 5H | 3 | 3 | 2 | 0 |
|  | 4H | 5 | 5 | 5 | 5 |
|  | 3H | 5 | 5 | 5 | 5 |
|  | 2H | 5 | 5 | 5 | 5 |
| Crack |  | Good | Good | Good | Good |
| Warp (mm) |  | 5 | 3 | 3 | 2 |

TABLE 6

|  |  | Comparative Examples | | |
| --- | --- | --- | --- | --- |
|  |  | 1 | 2 | 3 |
| Radiation-curable coating material |  | X1' | X2' | X3' |
| Urethane acrylate (parts) | a1 | 100 |  |  |
|  | a2 |  | 100 |  |
|  | a3 |  |  | 100 |
| Butyl acetate (parts) |  | 60 | 60 | 60 |
| Irgacure #184 (parts) |  | 3.2 | 3.2 | 3.2 |
| Nonvolatile component (%) |  | 50 | 50 | 50 |
| Evaluation results |  |  |  |  |
| Pencil hardness | 6H | 2 | 0 | 0 |
|  | 5H | 5 | 0 | 0 |
|  | 4H | 5 | 0 | 5 |
|  | 3H | 5 | 3 | 5 |
|  | 2H | 5 | 5 | 5 |
| Crack |  | Poor | Good | Poor |
| Warp (mm) |  | X | 0 | 20 |

The invention claimed is:

1. A radiation-curable resin composition comprising an urethane (meth)acrylate (A) obtained by reacting a bicyclo ring-containing polyisocyanate compound (a1), a hydroxyl group-containing, trifunctional or higher polyfunctional (meth)acrylate (a2) and a tris(2-hydroxyalkyl)isocyanurate di(meth)acrylate (a3).

2. The radiation-curable resin composition according to claim 1, wherein the urethane (meth)acrylate (A) is urethane (meth)acrylate obtained by reacting the bicyclo ring-containing polyisocyanate compound (a1), the hydroxyl group-containing, trifunctional or higher polyfunctional (meth)acrylate (a2) and the tris(2-hydroxyethyl)isocyanurate di(meth)acrylate (a3) in a molar ratio (OH/NCO) of hydroxyl group/isocyanate group within a range from 1.0 to 1.25.

3. The radiation-curable resin composition according to claim 1, wherein the urethane (meth)acrylate (A) is urethane (meth)acrylate obtained by using norbornane diisocyanate as the bicyclo ring-containing polyisocyanate compound (a1), using pentaerythritol tri(meth)acrylate as the hydroxyl group-containing, trifunctional or higher polyfunctional (meth)acrylate (a2), and using tris(2-hydroxyethyl)isocyanurate di(meth)acrylate (a3) as the tris(2-hydroxyalkyl)isocyanurate di(meth)acrylate (a3).

4. The radiation-curable resin composition according to claim 3, wherein the urethane (meth)acrylate (A) is urethane (meth)acrylate obtained by using pentaerythritol tri(meth)acrylate and tris(2-hydroxyethyl)isocyanurate di(meth)acrylate in a weight ratio [(a2)/(a3)] within a range from 99.9/0.1 to 30/70.

5. The radiation-curable resin composition according to claim 1, further comprising a radical polymerizable monomer (B) other than the urethane (meth)acrylate compound (A).

6. The radiation-curable resin composition according to claim 1, further comprising a photopolymerization initiator (D).

7. A radiation-curable coating material comprising the resin composition for radiation-curable coating material according to claim 1.

8. A method for forming a protective layer, which comprises:

applying the radiation-curable coating material according to claim 7 onto a support to form a layer of the radiation-curable coating material thereon; and irradiating the layer of the coating material with radiation thereby curing the layer of the coating material to form a protective layer.

* * * * *

UNITED STATES PATENT AND TRADEMARK OFFICE
CERTIFICATE OF CORRECTION

PATENT NO. : 8,414,979 B2
APPLICATION NO. : 12/530070
DATED : April 9, 2013
INVENTOR(S) : Yohzoh Yamashina et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this
Ninth Day of July, 2013

Teresa Stanek Rea
*Acting Director of the United States Patent and Trademark Office*